United States Patent
Gross et al.

(10) Patent No.: US 7,296,132 B1
(45) Date of Patent: *Nov. 13, 2007

(54) METHOD AND APPARATUS FOR STORING PERFORMANCE PARAMETERS IN A LIMITED STORAGE SPACE

(75) Inventors: Kenny C. Gross, San Diego, CA (US); Keith A. Whisnant, San Diego, CA (US); Aleksey M. Urmanov, San Diego, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/598,607

(22) Filed: Nov. 13, 2006

(51) Int. Cl.
- *G06F 12/00* (2006.01)
- *G06F 7/00* (2006.01)
- *G06F 13/00* (2006.01)

(52) U.S. Cl. .................... 711/170; 707/101; 710/68
(58) Field of Classification Search ............. None
See application file for complete search history.

(56) References Cited

U.S. PATENT DOCUMENTS

| | | | |
|---|---|---|---|
| 6,901,582 B1 * | 5/2005 | Harrison | 717/127 |
| 6,981,119 B1 * | 12/2005 | Lepak et al. | 711/170 |
| 7,188,227 B2 * | 3/2007 | Luick | 711/172 |

* cited by examiner

*Primary Examiner*—Reginald Bragdon
*Assistant Examiner*—Mehdi Namazi
(74) *Attorney, Agent, or Firm*—Park, Vaughan & Fleming LLP; Gilbert Wong

(57) ABSTRACT

A system that records performance parameters from a computer system. During operation, the system periodically monitors performance parameters from the computer system and records the monitored performance parameters in a first storage space. Next, the system recurrently compresses the recorded performance parameters. This involves: (1) compressing the recorded performance parameters from the first storage space; (2) if insufficient space is available in a second storage space which is used to store compressed performance parameters, further compressing data in the second storage space to make room for the compressed performance parameters from the first storage space; and (3) storing the compressed performance parameters from the first storage space in the second storage space.

18 Claims, 12 Drawing Sheets

METHOD AND APPARATUS FOR STORING PERFORMANCE PARAMETERS IN A LIMITED STORAGE SPACE

RELATED APPLICATION

This application is related to a pending U.S. patent application, entitled "Method for Storing Long-Term Performance Data in a Computer System with Finite Storage Space," by inventors Kenny C. Gross, Steven K. Heller, Keith A. Whisnant, and Aleksey M. Urmanov, having Ser. No. 11/069,675, and filing date 28 Feb. 2005. The above-listed application is hereby incorporated by reference.

BACKGROUND

1. Field of the Invention

The present invention relates to a method and apparatus for recording performance parameters from a computer system.

2. Related Art

As electronic commerce becomes more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is important to ensure high availability in such enterprise computing systems.

To achieve high availability, it is necessary to be able to capture unambiguous diagnostic information that can quickly locate faults in hardware or software. If systems perform too little event monitoring, when a problem crops up at a customer site, service engineers may be unable to quickly identify the source of the problem. This can lead to increased down time.

Fortunately, high-end computer servers are now equipped with a large number of sensors that measure physical performance parameters such as temperature, voltage, current, vibration, and acoustics. Software-based monitoring mechanisms also monitor software-related performance parameters, such as processor load, memory and cache usage, system throughput, queue lengths, I/O traffic, and quality of service. Typically, special software analyzes the collected performance data and issues alerts when there is an anomaly. In addition, it is important to archive historical performance data to allow long-term monitoring and to discover slow system degradation.

One challenge in archiving historical performance data is that a computer typically has limited storage space. As time progresses, cumulatively storing real-time performance data will eventually fill up the assigned storage space. One way to resolve this problem is to use a circular file, where the oldest stored performance data is discarded to make room for newly collected data. However, this approach only maintains a historical archive of the last x days. Performance data from more than x days ago is permanently lost. It is therefore difficult to know how a system performed more than x days ago. Furthermore, it is difficult to maintain a historical archive of past performance data while efficiently using the allocated storage space.

Hence, what is needed is a method and an apparatus for recording performance parameters without the problems described above.

SUMMARY

One embodiment of the present invention provides a system that records performance parameters from a computer system. During operation, the system periodically monitors performance parameters from the computer system and records the monitored performance parameters in a first storage space. Next, the system recurrently compresses the recorded performance parameters. This involves: (1) compressing the recorded performance parameters from the first storage space; (2) if insufficient space is available in a second storage space which is used to store compressed performance parameters, further compressing data in the second storage space to make room for the compressed performance parameters from the first storage space; and (3) storing the compressed performance parameters from the first storage space in the second storage space.

In a variation on this embodiment, after multiple compressions, the second storage space contains sets of performance parameters with different amounts of compression.

In a variation on this embodiment, while recurrently compressing the recorded performance parameters, the system determines whether the utilization of the first storage space has reached a threshold. If so, the system compresses performance parameters from the first storage space.

In a variation on this embodiment, if the second storage space is empty, the system records the monitored performance parameters in the second storage space without compression.

In a variation on this embodiment, while compressing the recorded performance parameters, the system calculates an average value for every two successive data points in the recorded performance parameters. The system then replaces the every two successive data points with a new data point whose value is the average value of the two successive data points being replaced.

In a variation on this embodiment, the performance parameters can include hardware variables and/or software variables.

In a further variation, the software variables include load metrics, CPU utilization, idle time, memory utilization, disk activity, transaction latencies, and other performance metrics reported by the operating system.

In a further variation, the hardware variables include temperature, voltage, and current.

In a further variation, the compressed performance parameters can include statistical information about the uncompressed performance parameters, wherein the statistical information can include: an average value of a variable; a variance of the variable; a maximum value of the variable; and a minimum value of the variable.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Performance Monitoring in a Computer System

Figure 1:
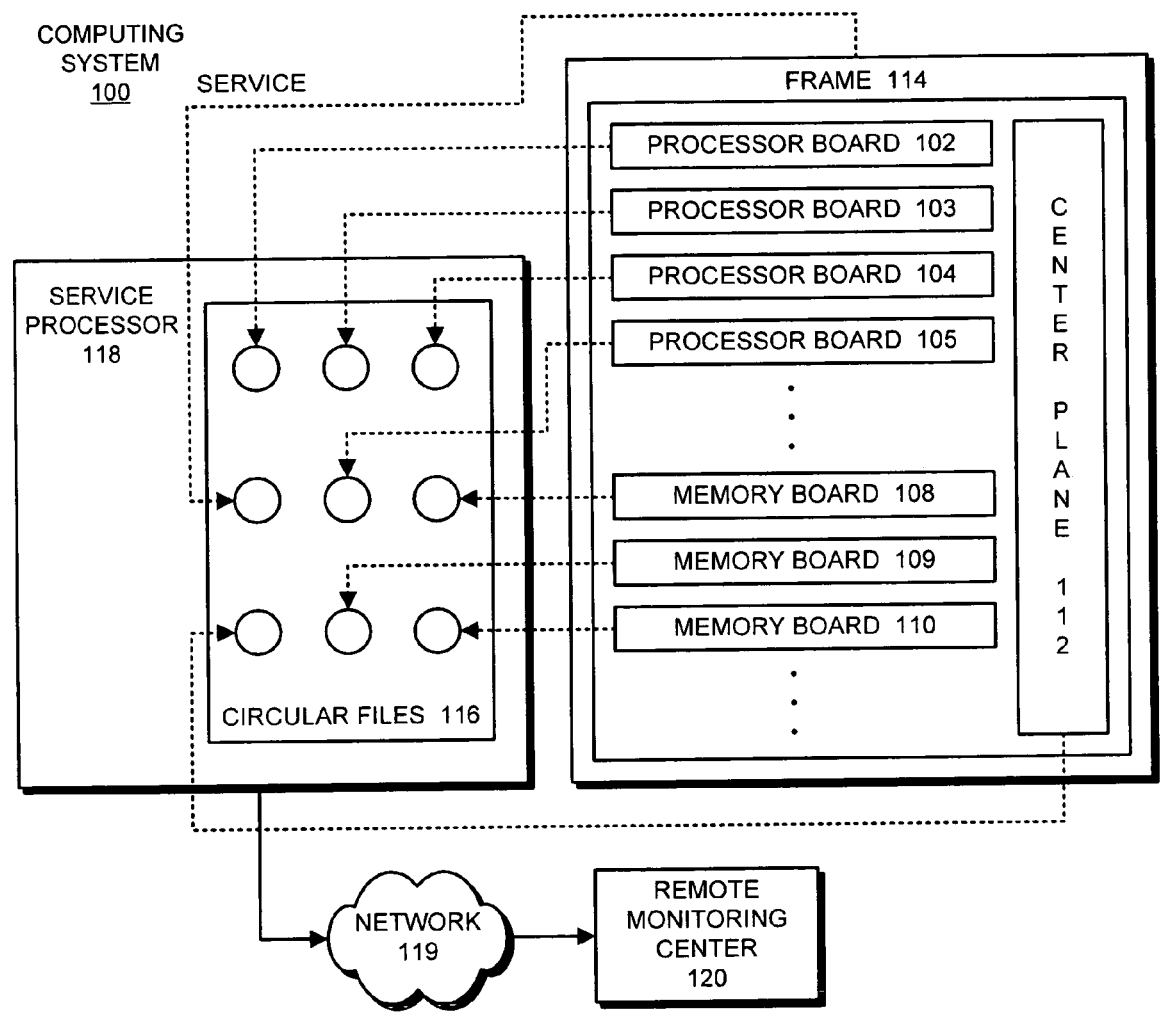
FIG. 1 illustrates a computer system which includes a service processor for processing telemetry signals in accordance with one embodiment of the present invention.

FIG. 1 illustrates a computer system which includes a service processor for processing telemetry signals in accordance with one embodiment of the present invention. As is illustrated in FIG. 1, computer system 100 includes a number of processor boards 102-105 and a number of memory boards 108-110, which communicate with each other through center plane 1112. These system components are all housed within a frame 114.

In one embodiment of the present invention, these system components and frame 114 are all field replaceable units (FRUs), which are independently monitored as is described below. Note that all major system units, including both hardware and software, can be decomposed into FRUs. For example, a software FRU can include an operating system, a middleware component, a database, or an application.

Computer system 100 is associated with a service processor 118, which can be located within computer system 100, or alternatively can be located in a standalone unit separate from computer system 100. Service processor 118 performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within the computer system. In one embodiment of the present invention, there exists one dedicated circular file for each FRU within computer system 100. Note that this circular file can have a dual-stage structure as is described below with reference to FIG. 2.

Zeno's Circular File Technique for Storing Performance Data

In general, it is desirable to retain the collected performance data. For example, a system can capture the telemetry signals into a "Black Box Flight Recorder" file. This file retains digitized telemetry signals collected in the past and can be useful in diagnosing the cause of failures. One challenge, however, is to provide sufficient storage space for the "Black Box" file, because the "Black Box" file can potentially grow infinitely. One way to cope with this problem is to use a circular file, which retains only the last x days' worth of data. The drawback of using a fixed-size circular file is that one loses the long-term trend behavior of the signals. On the other hand, if one allows the "Black Box" file to grow infinitely, the file may eventually crash the storage system.

To resolve this problem, one embodiment of the present invention adopts a two-tier file system which includes a real-time circular file and a lifetime history file. Both files have finite sizes. The real-time circular file stores real-time performance data for a limited amount of time (e.g., for seven days). When the real-time circular file is full, its data is consolidated and transferred to the lifetime history file. The system recurrently compresses the data stored in the lifetime history file, thereby allowing more data to be stored in the future.

Figure 2:
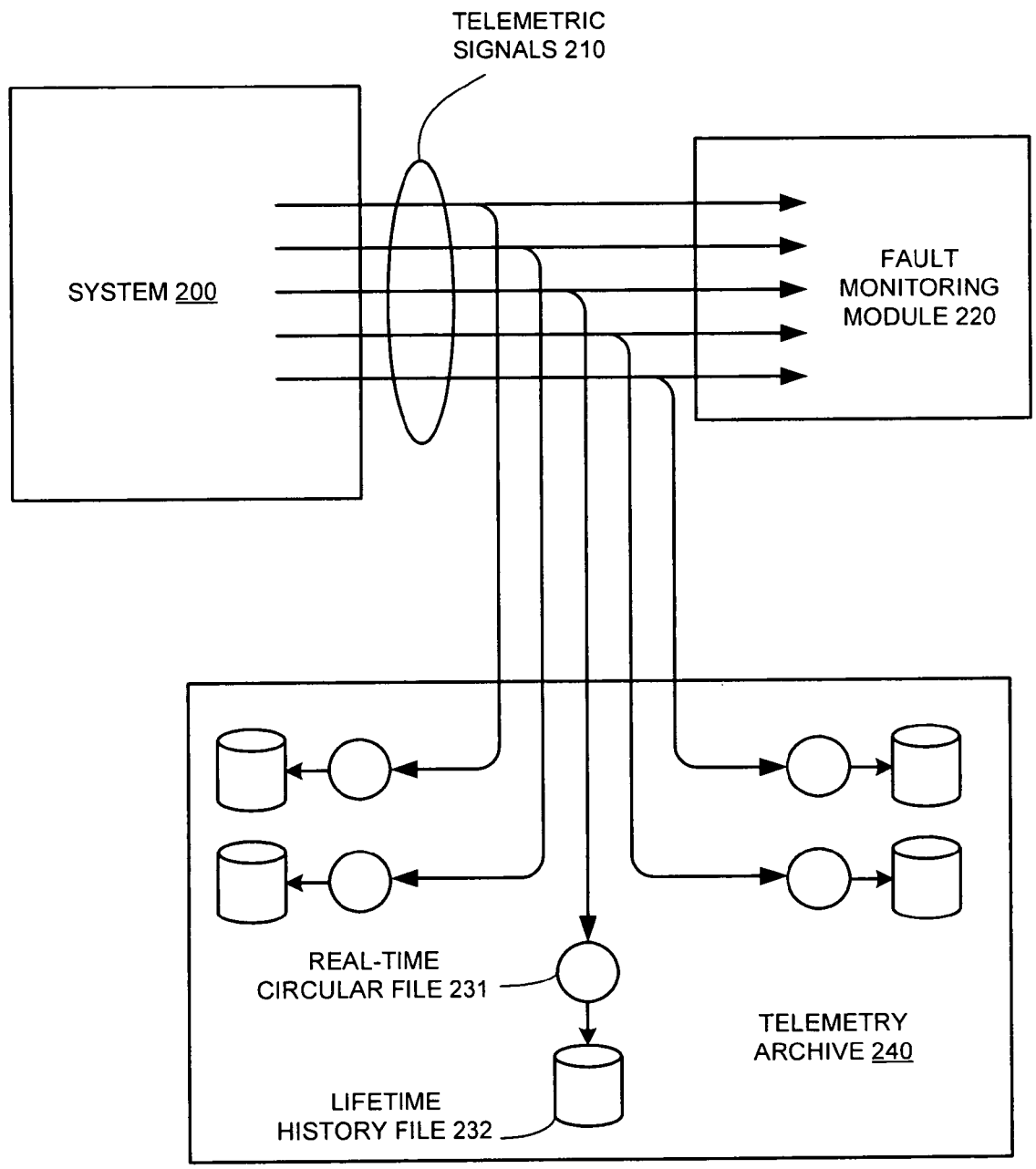
FIG. 2 illustrates a telemetry data archiving system which records both short-term real-time performance data and long-term historical performance data in accordance with an embodiment of the present invention.

FIG. 2 illustrates a telemetry data archiving system which records both short-term real-time performance data and long-term historical performance data in accordance with an embodiment of the present invention. In this example, computer system 200 is monitored with a number of telemetric signals 210, which are transmitted to a fault monitoring module 220. Fault monitoring module 220 analyses telemetric signals 210, and issues alerts when there is an anomaly.

Telemetric signals 210 are also sent to a telemetry archive 240. Within telemetry archive 240, each telemetry signal is recorded in a real-time circular file and subsequently a lifetime history file. As shown in FIG. 2, real-time circular file 231 saves the real-time data of one of the telemetric signals. When real-time circular file 231 is full, its data is consolidated and transferred to lifetime history file 232.

In one embodiment of the present invention, lifetime history file 232 and real-time circular file 231 are stored on a storage device (not shown). Note that the storage device can include any type of non-volatile storage device that can be coupled to a computer system. This includes, but is not limited to, magnetic, optical, and magneto-optical storage devices, as well as storage devices based on flash memory and/or battery-backed up memory.

In one embodiment of the present invention, a compression mechanism compresses the data stored in the lifetime history file when it is full. In one embodiment of the present invention, the compression mechanism computes an ensemble average of every two successive data points, and replaces these two data points with a new data point whose value is the ensemble average thereof. One may use other compression methods, such as discarding every other data point. However, replacing two data points with their average is beneficial because it retains characteristics of the original signal to a certain degree. For example, if there is a very narrow spike in the original signal that lasts for only one sampling interval, discarding every other data point would result in a 50% probability of losing the spike. Conversely, taking ensemble averages of adjacent data pairs can preserve the spike, even if the averaging process can reduce the amplitude of the spike.

Figure 3:
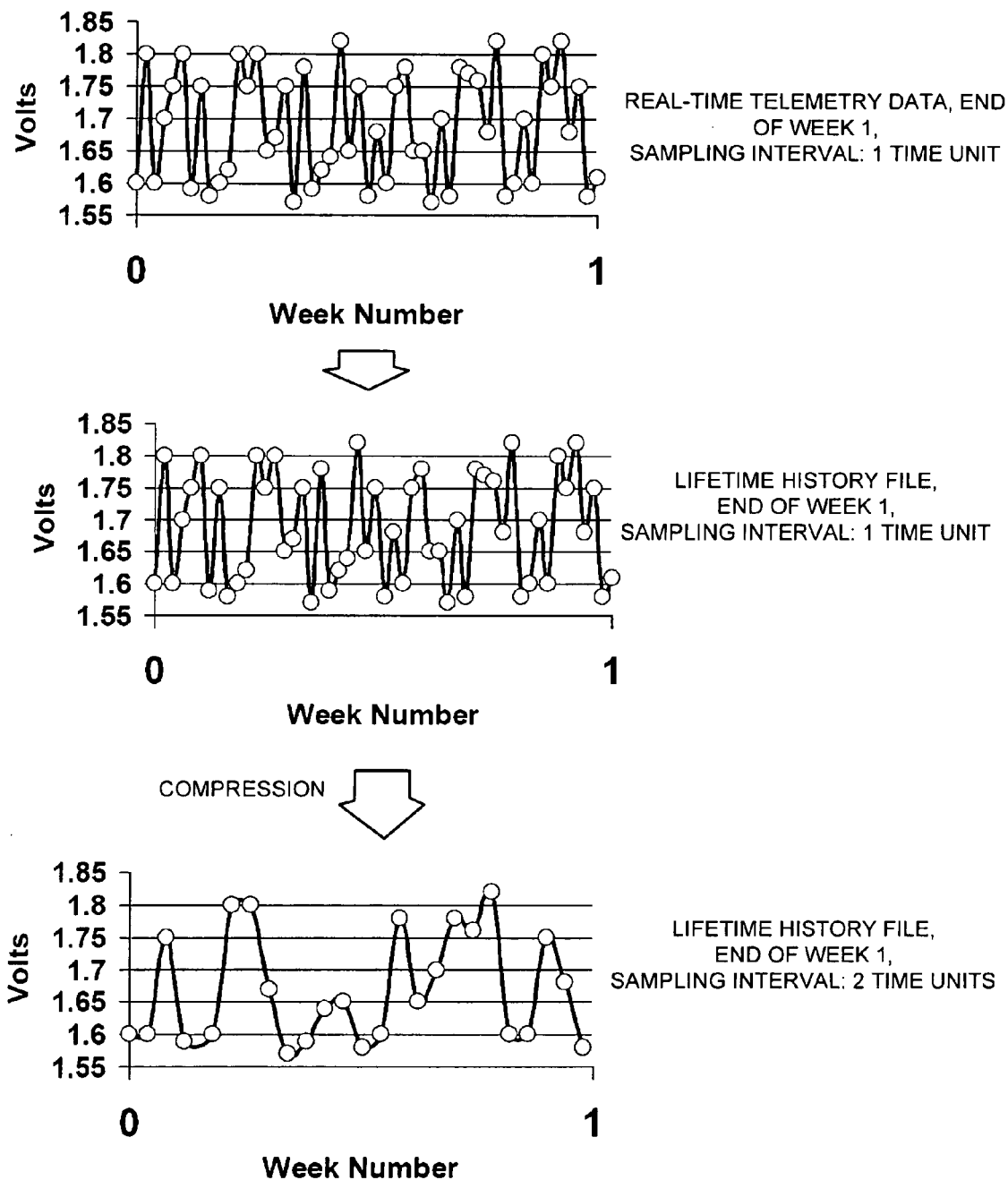
FIG. 3 illustrates an exemplary compression process of the lifetime history file where the final sampling interval is 2 time units in accordance with an embodiment of the present invention.

FIG. 3 illustrates an exemplary compression process of the lifetime history file where the final sampling interval is 2 time units in accordance with an embodiment of the present invention. In this example, the performance parameter under observation is a time series of telemetry data represented in voltage. The real-time circular file is assumed to be able to store one week's worth of real-time performance data. The lifetime historical file is assumed to have the same size as the real-time circular file.

At the top of FIG. 3 are the data points recorded in the real-time circular file at the end of week 1. By the end of week 1, the recorded real-time data has filled up all the space in the real-time circular file. As a result, a data-consolidation process is invoked. The data consolidation process is responsible for compressing the recorded real-time data from the real-time circular file so that the compressed data can be stored in the lifetime history file. However, at the end of week 1, the lifetime history file is empty. Therefore, the data consolidation process does not need to compress the recorded real-time data before transferring the data from the real-time circular file to the lifetime history file. After its data is consolidated and transferred to the lifetime history file, the real-time circular file is ready to record real-time telemetry data for week 2.

In the middle of FIG. 3 are the data points in the lifetime history file after data is transferred from the real-time circular file at the end of week 1. Note that at this moment, the data points in the lifetime history file are identical to those stored in the real-time circular file prior to the transfer. The lifetime history file is currently full, and the sampling interval of its data points is 1 time unit. This is because no compression has occurred yet.

Because the lifetime history file is now full, a data compression process is triggered. This compression process compresses the data points currently stored in the lifetime history file, so that more storage space within the file is available for storing future data points consolidated and transferred from the real-time circular file. The compression process replaces every two neighboring data points with a new data point whose value is the ensemble average of the two replaced data points.

Shown at the bottom of FIG. 3 are the data points in the lifetime history file after the compression process. The resulting data in the lifetime history file is one week's worth of ensemble averages for week 1. The sampling interval is now 2 time units. Correspondingly, the number of data points is reduced by 50%, and the lifetime history file is 50% full.

Figure 4:
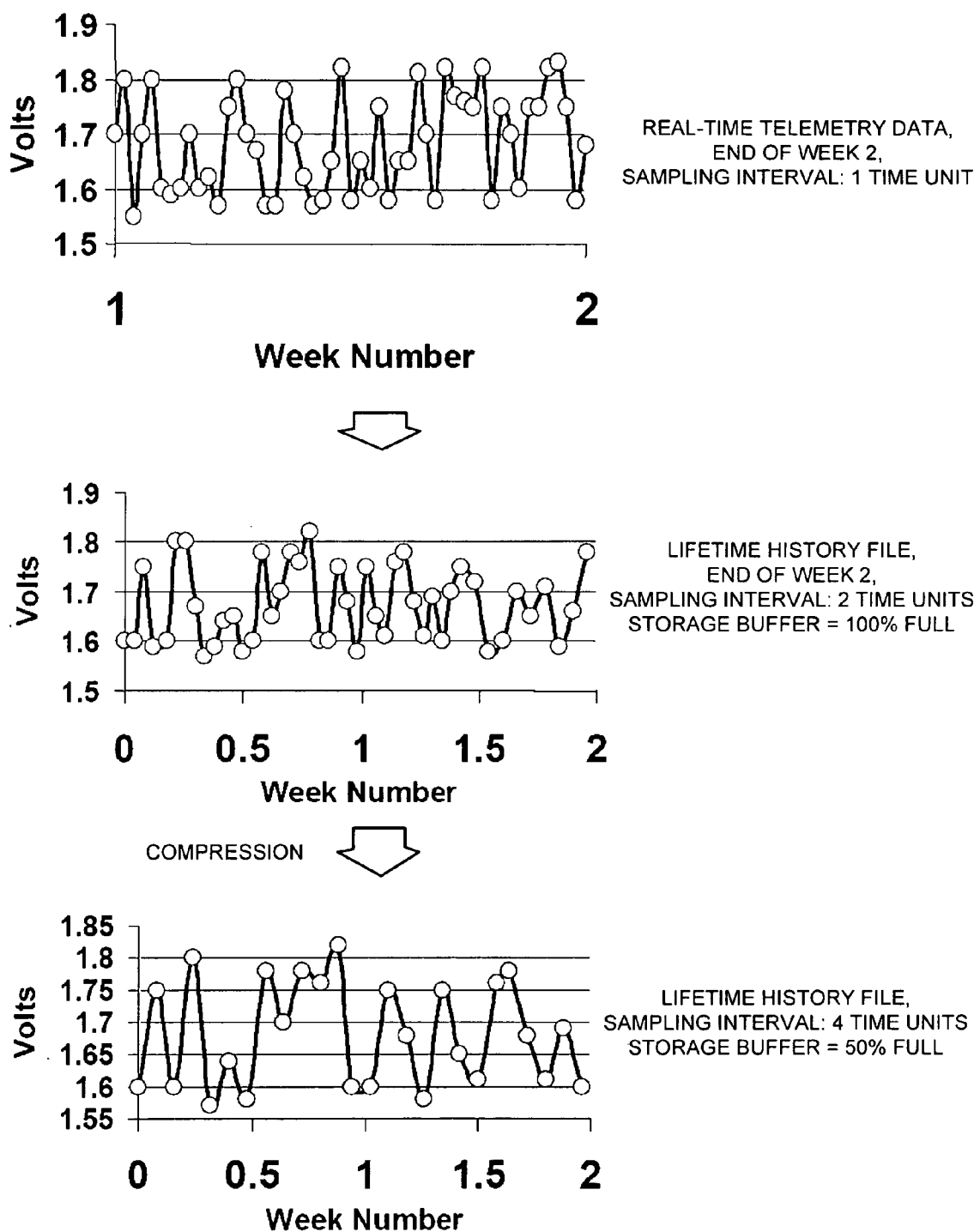
FIG. 4 illustrates an exemplary compression process of the lifetime history file where the final sampling interval is 4 time units in accordance with an embodiment of the present invention.

FIG. 4 illustrates an exemplary compression process of the lifetime history file where the final sampling interval is 4 time units in accordance with an embodiment of the present invention. Subsequent to data compression process at the end of week 1 as shown in FIG. 3, the real-time circular file continues collecting real-time telemetry data into week 2. FIG. 4 illustrates the state of the real-time circular file and the lifetime history file at the end of week 2.

At the top of FIG. 4 are the data points recorded in the real-time circular file at the end of week 2. By the end of week 2, the recorded real-time data has again filled up all the space in the real-time circular file. Consequently, the data-consolidation process is invoked. The lifetime history file now contains compressed historical data from week 1. Therefore, the data consolidation process compresses the recorded real-time data before transferring the data from the real-time circular file to the lifetime history file.

During the consolidation process, the compression ratio ideally matches the compression ratio of the historical data stored in the lifetime history file. In this example, the historical data has undergone one compression process and hence has a compression ratio of 2 to 1 with respect to the uncompressed real-time data. Therefore, the consolidation process replaces every two data points in the real-time circular file with a new data point whose value is the ensemble average of the two original data points. Note that if the compression ratio is 4 to 1, the consolidation process would replace four real-time data points with a new ensemble-average data point. After its data is consolidated and transferred to the lifetime history file, the real-time circular file clears its storage space and is ready to record real-time telemetry data for week 3.

In the middle of FIG. 4 are the data points in the lifetime history file after real-time data is consolidated and transferred from the real-time circular file at the end of week 2. The lifetime history file is once again 100% full with two week's worth of historical data, and the sampling interval of its data points is 2 time units.

Because the lifetime history file is full, the data compression process is triggered. The compression process again replaces every two neighboring data points with a new data point whose value is the ensemble average of the two replaced data points. Shown at the bottom of FIG. 4 are the data points in the lifetime history file after the compression process. The resulting data in the lifetime history file is two weeks' worth of ensemble averages for weeks 1 and 2. The sampling interval is now 4 time units and the lifetime history file is 50% full.

Note that the above described consolidation process for the real-time circular file occurs at the end of every week, because the real-time circular file becomes full once a week. The compression process for the lifetime history file is triggered when the file is full. Hence, the compression process occurs at the end of week 1, 2, 4, . . . , $2^n$, where n is the number of compressions performed on the historical data. n also determines the compression ratio of the consolidation process, which is $2^n$ to 1.

Figure 5:
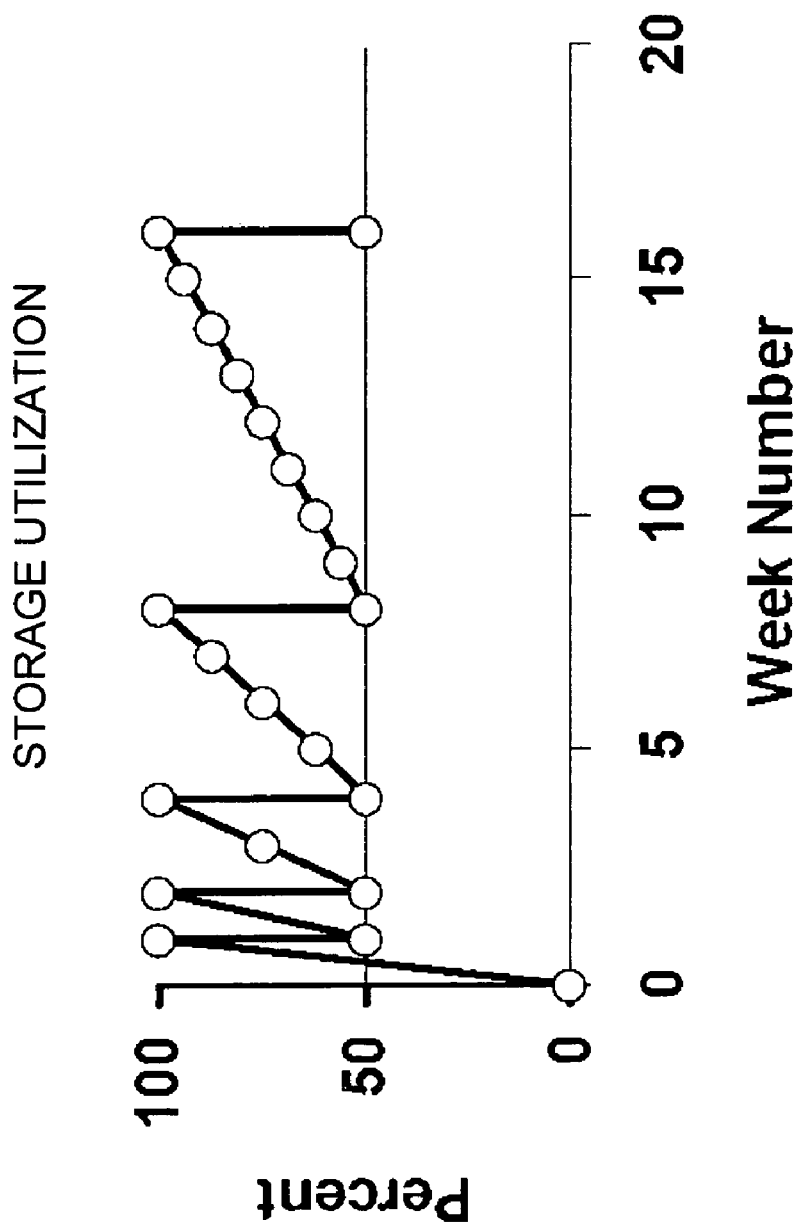
FIG. 5 illustrates the storage utilization of the lifetime history file in accordance with one embodiment of the present invention.

With the consolidation and compression process, the lifetime history file may continuously store historical data with limited storage space. FIG. 5 illustrates the storage utilization of the lifetime history file in accordance with one embodiment of the present invention. At the end of week 1, the lifetime history file is full. The compression process is triggered for the first time and reduces the storage utilization of the lifetime history file to 50%. At the end of week 2, the file is full again with 2 time-unit ensemble average data points. The compression process is triggered and reduces the storage utilization back to 50%. This process may continue for a long time. The resulting average of the storage utility is 75%.

Figure 6:
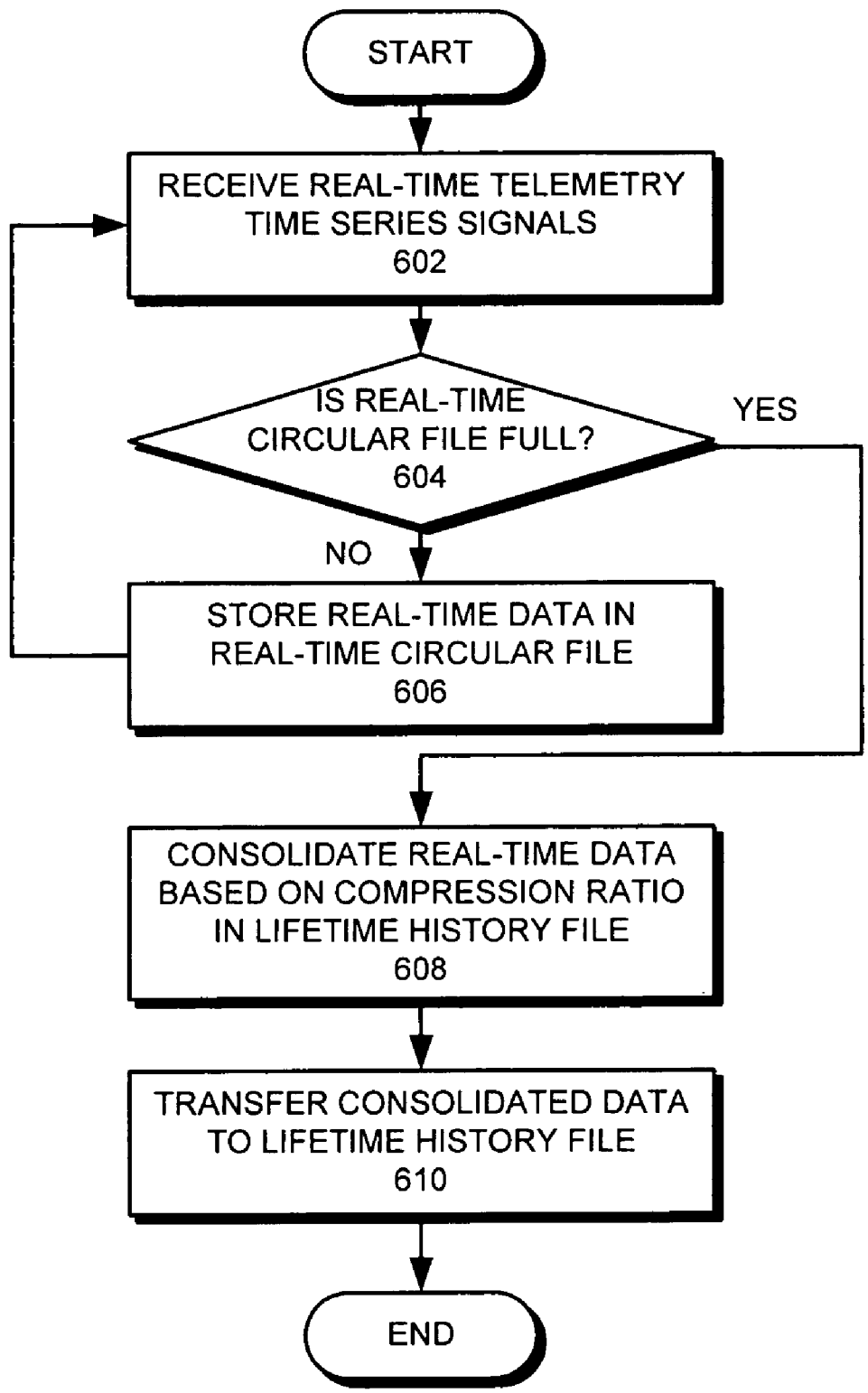
FIG. 6 presents a flow chart illustrating the process of consolidating recorded real-time performance data when a real-time circular file is full in accordance with an embodiment of the present invention.

FIG. 6 presents a flow chart illustrating the process of consolidating recorded real-time performance data when a real-time circular file is full in accordance with an embodiment of the present invention. During operation, the system receives real-time telemetry time series signals (step 602). The system then determines whether the real-time circular time is full (step 604). If it is not full, the system stores the received data in the real-time circular file (step 606) and continues to collect additional real-time data (step 602).

If the real-time circular file is full, the system consolidates the real-time data based on the compression ratio of the historical data in the lifetime history file (step 608). The system then transfers the consolidated data to the lifetime history file (step 610)

Figure 7:
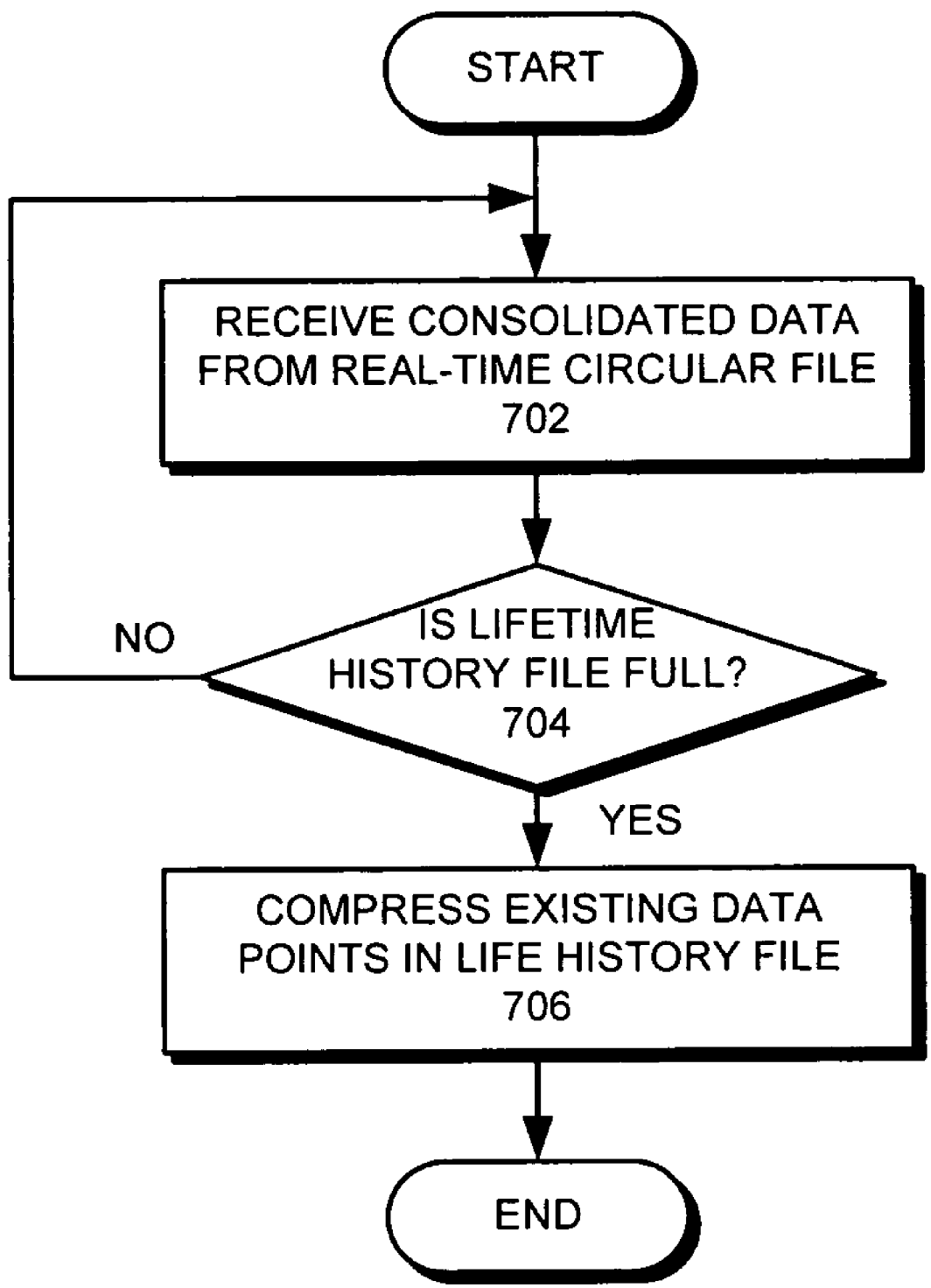
FIG. 7 presents a flow chart illustrating the process of compressing data in a lifetime history file in accordance with an embodiment of the present invention.

FIG. 7 presents a flow chart illustrating the process of compressing data in a lifetime history file in accordance with an embodiment of the present invention. During operation, the system receives the consolidated data from the real-time circular file (step 702). The system then determines whether the lifetime history file is full (step 704). If it is not full, the system prepares to receive additional consolidated data from the real-time circular file (step 702). If the lifetime history file is full, the system compresses the existing historical data points in the life history file (step 706).

Telescopic Continuum Technique for Storing Performance Data

Unfortunately, the technique described above only achieves an average storage space utilization rate of 75%. Moreover, both old and new telemetry data is compressed at the same compression ratio. Furthermore, the compression ratio uniformly increases as more telemetry data is recorded. These properties are undesirable when performing root cause analyses because it is useful to have more fine-grained telemetry data (i.e., less compression) near the time of the failure. Since older telemetry data is less-likely to be relevant in a failure analysis, older telemetry can be more coarse-grained (i.e., more compression). Hence, one embodiment of the present invention provides a systematic statistical data compression technique that achieves a storage space utilization rate of nearly 100%. This technique is referred to as the "Telescopic Continuum Technique." Note that this technique can be applied to any system that monitors time series telemetry signals.

One embodiment of the present invention achieves high-density statistical compression (i.e. substantial degree of smoothing) for the oldest data, and low-density compression (i.e., high resolution) for the most recent data. This property is desirable when performing root cause analyses because the mechanisms that can cause a failure event typically produce symptoms that can be observed in the most-recent telemetry signatures.

One embodiment of the present invention adjusts the degree of smoothing so that the storage space allocated for the archival of telemetry data is never exceeded.

Figure 8A:
FIG. 8A illustrates storage space used to record performance parameters in accordance with an embodiment of the present invention.

FIG. 8A illustrates exemplary storage spaces 801 and 802 used to record performance parameters in accordance with an embodiment of the present invention. In one embodiment of the present invention, storage spaces 801 and 802 are the same size. In another embodiment of the present invention, storage spaces 801 and 802 are different sizes.

Figure 8B:
FIG. 8B illustrates an exemplary real-time circular file used to record a first set of performance parameters in accordance with an embodiment of the present invention.

In one embodiment of the present invention, real-time telemetry data is collected into a real-time circular file (RCF) which is stored in the allocated storage space. FIG. 8B illustrates an exemplary RCF 803 used to record a first set of performance parameters in accordance with an embodiment of the present invention. In one embodiment of the present invention, RCF 803 can store telemetry data for a specified amount of time. For example, RCF 803 can store up to one week of telemetry data. As illustrated in FIG. 8B, RCF 803 stores telemetry data from week 1.

Figure 8C:
FIG. 8C illustrates two exemplary real-time circular files used to record two sets of performance parameters in accordance with an embodiment of the present invention.

In one embodiment of the present invention, when the size of RCF 803 has reached a threshold, storage space 801 is used as a real-time circular file to store real-time performance parameters. In one embodiment of the present invention, the threshold for RCF 803 is reached when the storage space allocated to RCF 803 is full. This embodiment is illustrated in FIG. 8C, wherein storage space 801 is used as RCF 804 to store telemetry data from week 2.

In one embodiment of the present invention, when RCF 804 has reached a threshold, the telemetry data stored in RCFs 803 and 804 are compressed and stored in a lifetime history file (LHF). In one embodiment of the present invention, the threshold for RCF 804 is reached when the storage space allocated to RCF 804 is full. This embodiment is illustrated in FIG. 8D, wherein RCF 804 is converted to an LHF 805 and used to store compressed telemetry data from RCFs 803 and 804.

One embodiment of the present invention uses an ensemble average (described above) to compress the telemetry data. Hence, every two successive data points is replaced with a new data point which has a value that is the average of the two successive data points. This compression process effectively reduces the number of data points by a factor of two (i.e., the effective sampling rate is reduced by a factor of two). For example, in FIG. 8C, if the sampling rate of the telemetry data for week 1 stored in RCF 803 is one sample per time unit, after applying the ensemble average to the telemetry data for week 1, the effective sampling rate of the compressed telemetry data for week 1 is one sample every two time units.

Each time the ensemble average is taken, the effective sampling rate for the telemetry data decreases by a factor of two (i.e., doubles the time interval between samples). The compression process is illustrated in FIGS. 8D-8H.

Figure 8D:
FIG. 8D illustrates an exemplary real-time circular file and an exemplary lifetime history file used to record performance parameters in accordance with an embodiment of the present invention.

FIG. 8D illustrates the state of RCF 803 and LHF 805 after recording telemetry data for week 3. In FIG. 8D, the effective sampling rate is once every two time units for weeks 1 and 2, and once every time unit for week 3.

Figure 8E:
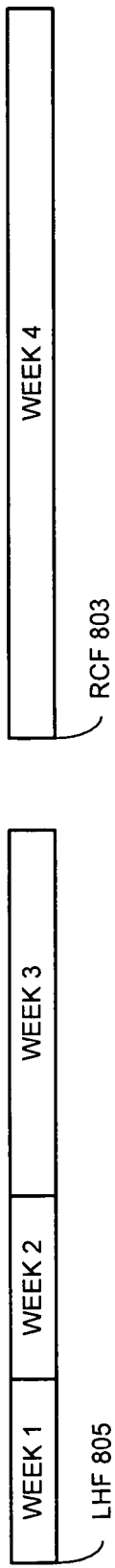
FIG. 8E illustrates the real-time circular file and the lifetime history file illustrated in FIG. 8D after another set of performance parameters has been recorded in accordance with an embodiment of the present invention.

FIG. 8E illustrates the state of RCF 803 and LHF 805 after recording telemetry data for week 4. In FIG. 8E, the effective sampling rate is once every four time units for weeks 1 and 2, once every two time units for week 3, and once every time unit for week 4.

Figure 8F:
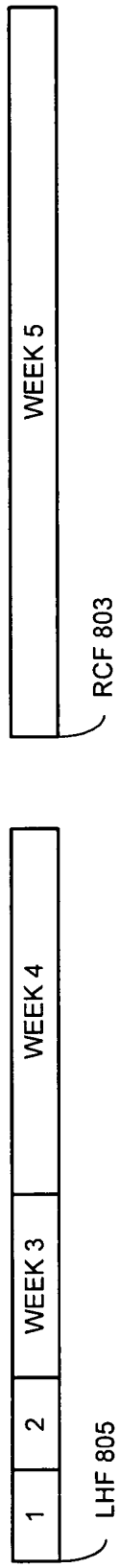
FIG. 8F illustrates the real-time circular file and the lifetime history file illustrated in FIG. 8E after another set of performance parameters has been recorded in accordance with an embodiment of the present invention.

FIG. 8F illustrates the state of RCF 803 and LHF 805 after recording telemetry data for week 5. In FIG. 8F, the effective sampling rate is once every eight time units for weeks 1 and 2, once every four time units for week 3, once every two time units for week 4, and once every time unit for week 5.

Figure 8G:
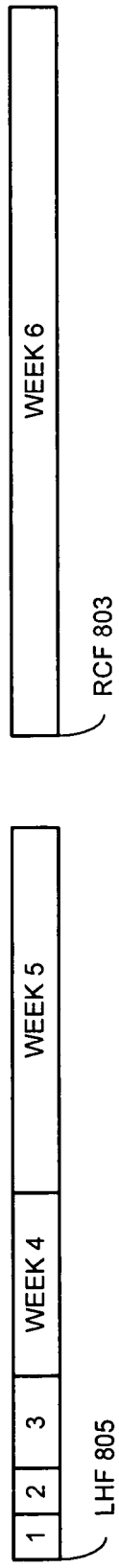
FIG. 8G illustrates the real-time circular file and the lifetime history file illustrated in FIG. 8F after another set of performance parameters has been recorded in accordance with an embodiment of the present invention.

FIG. 8G illustrates the state of RCF 803 and LHF 805 after recording telemetry data for week 6. In FIG. 8G, the effective sampling rate is once every sixteen time units for weeks 1 and 2, once every eight time units for week 3, once every four time units for week 4, once every two time units for week 5, and once every time unit for week 6.

Figure 8H:
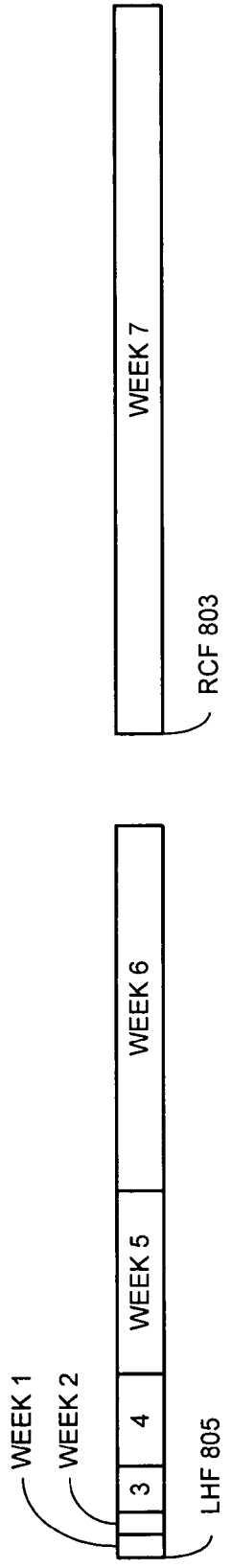
FIG. 8H illustrates the real-time circular file and the lifetime history file illustrated in FIG. 8G after another set of performance parameters has been recorded in accordance with an embodiment of the present invention.

FIG. 8H illustrates the state of RCF 803 and LHF 805 after recording telemetry data for week 7. In FIG. 8H, the effective sampling rate is once every thirty-two time units for weeks 1 and 2, once every sixteen time units for week 3, once every eight time units for week 4, once every four time units for week 5, once every two time units for week 6, and once every time unit for week 7. As illustrated in FIGS. 8D-8H, the compression ratios for the compressed telemetry increases as the telemetry data becomes older. Note that this technique differs from the previously-presented technique in that the telemetry data is not uniformly compressed as more telemetry data is recorded. Hence, more-recent telemetry data is stored at a higher resolution than older telemetry data.

Figure 9:
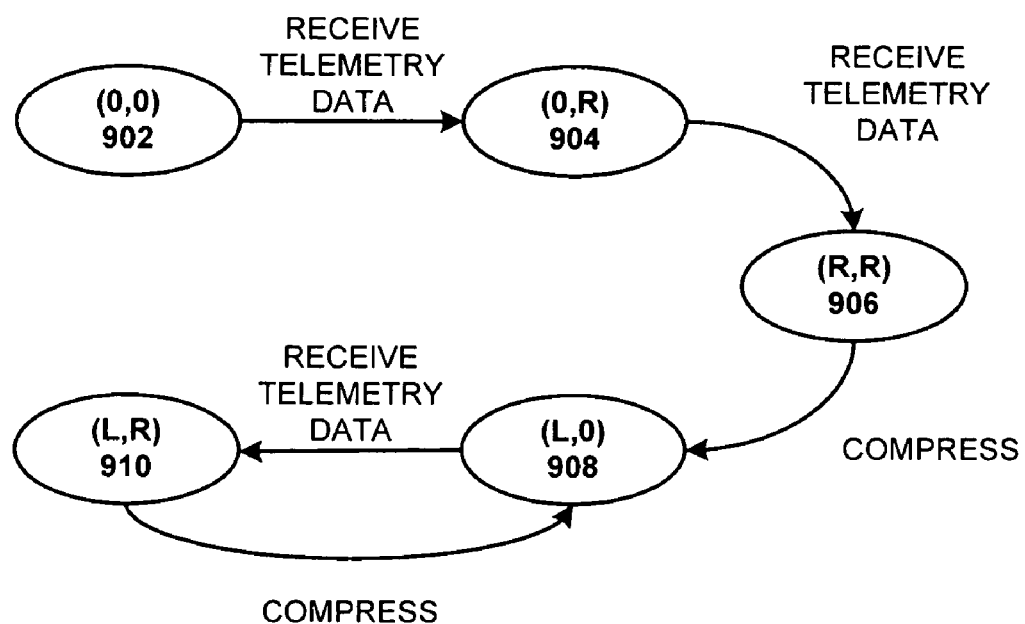
FIG. 9 illustrates a finite state machine used when recording performance parameters in accordance with an embodiment of the present invention.

Note that the storage space requirements depend on the sampling rate of the telemetry data. For example, consider a sampling rate of once every 37 seconds. In this case, the number of data points generated each week is approximately $2^{14}$ (16384) data points. Hence, the storage requirements for this sampling rate is:

size of $RCF$=16 kB×size of each data point×number of signals size of $LHF$=size of $RCF$ FIG. 9 illustrates a finite state machine used when recording performance parameters in accordance with an embodiment of the present invention. State 902 is the initial state wherein both storage spaces are empty. An RCF is created in one of the storage spaces to record telemetry data (state 904). When the size of the RCF reaches a threshold, a second RCF is created in the second storage space (state 906).

When the size of the second RCF reaches the threshold, the telemetry data stored in both RCFs are compressed and an LHF is created in one of the storage spaces (state 908). The compressed telemetry data from both RCFs is then stored in the LHF, thereby freeing up one of the storage spaces.

The empty storage space is then used as an RCF to store newly-received telemetry data (step 910). When the size of the RCF reaches the threshold, the telemetry data stored in the RCF is compressed. The newly-compressed telemetry data is then transferred to the LHF, thereby freeing up a storage space (state 908). In one embodiment of the present invention, if the size of the LHF reaches a threshold, the compressed telemetry data stored in the LHF is further compressed to make room for the newly-compressed RCF telemetry data. Note that the processes that occur between states 908 and 910 can continue indefinitely.

Figure 10:
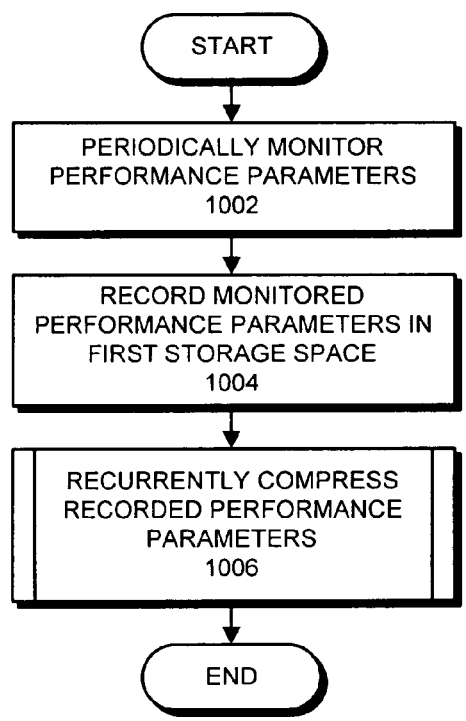
FIG. 10 presents a flowchart illustrating the process of recording performance data in accordance with an embodiment of the present invention.

FIG. 10 presents a flowchart illustrating the process of recording performance data in accordance with an embodiment of the present invention. The process begins when the system periodically monitors performance parameters from the computer system (step 1002). Next, the system records the monitored performance parameters in a first storage space (step 1004). The system then recurrently compresses the recorded performance parameters (step 1006). Note that step 1006 is described in more detail in reference to FIGS. 11 and 12 below.

In embodiment of the present invention, the performance parameters can include hardware variables and/or software variables. In one embodiment of the present invention, the software variables include load metrics, CPU utilization, idle time, memory utilization, disk activity, transaction latencies, and other performance metrics reported by the operating system. In one embodiment of the present invention, the hardware variables include temperature, voltage, and current.

In one embodiment of the present invention, the compressed performance parameters can include statistical information about the uncompressed performance parameters, wherein the statistical information can include: an average value of a variable; a variance of the variable; a maximum value of the variable; and a minimum value of the variable.

Figure 11:
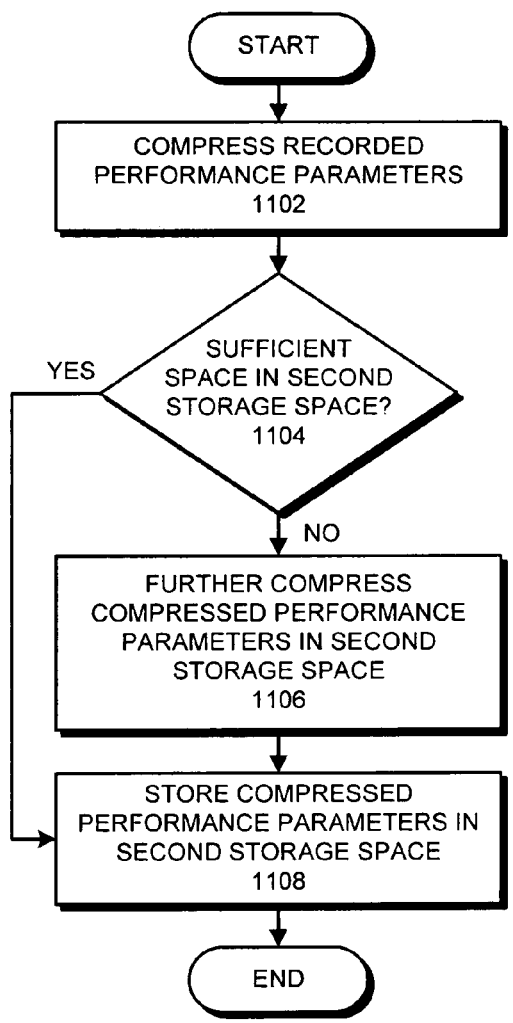
FIG. 11 presents a flowchart illustrating the process of recurrently compressing recorded performance parameters.

FIG. 11 presents a flowchart illustrating the process of recurrently compressing recorded performance parameters. The process begins when the system compresses the recorded performance parameters from the first storage space (step 1102). If insufficient space is available in a second storage space which is used to store compressed performance parameters (step 1104—no), the system further compresses compressed performance parameters in the second storage space to make room for the compressed performance parameters from the first storage space (step 1106). The system then stores the compressed performance parameters from the first storage space in the second storage space (step 1108).

Figure 12:
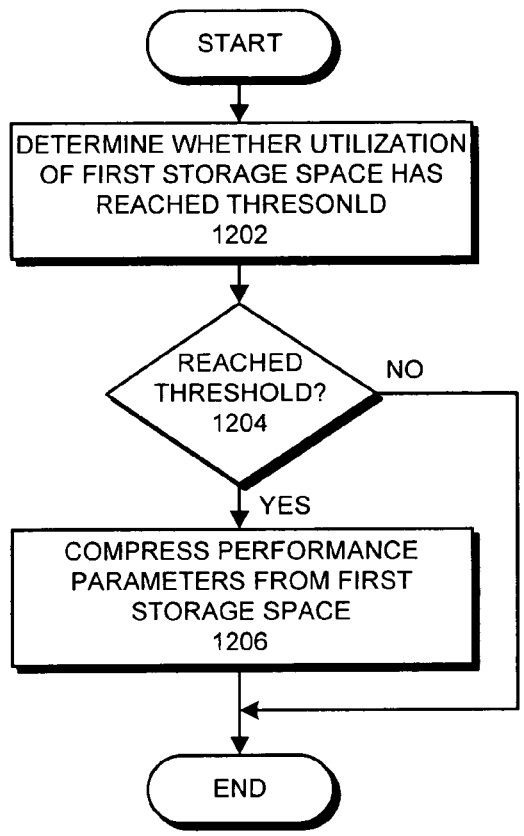
FIG. 12 presents a flowchart illustrating the process of determining when to compress the recorded performance parameters.

FIG. 12 presents a flowchart illustrating the process of determining when to compress the recorded performance parameters. The process begins when the system determines whether the utilization of the first storage space has reached a threshold (step 1202). If so (step 1204—yes), the system compresses performance parameters from the first storage space (step 1206).

Figure 13:
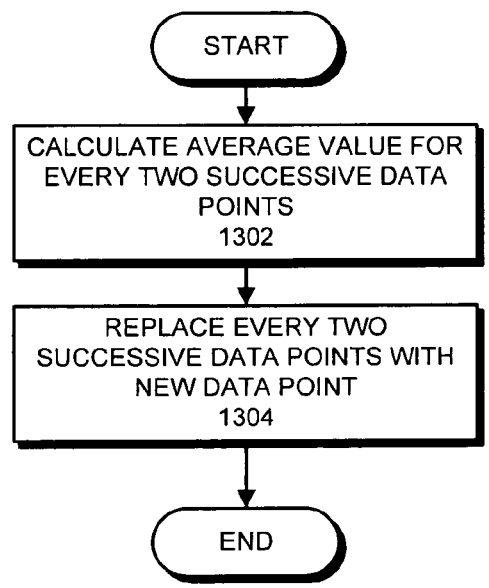
FIG. 13 presents a flowchart illustrating the process of compressing the recorded performance parameters.

FIG. 13 presents a flowchart illustrating the process of compressing the recorded performance parameters. The process begins when the system calculates an average value for every two successive data points in the recorded performance parameters (step 1302). The system then replaces the every two successive data points with a new data point whose value is the average value of the two successive data points being replaced (step 1304).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for recording performance parameters from a computer system, comprising:
   periodically monitoring performance parameters from the computer system;
   recording the monitored performance parameters in a first storage space;
   recurrently compressing the recorded performance parameters by,
      compressing the recorded performance parameters from the first storage space,
      if insufficient space is available in a second storage space which is used to store compressed performance parameters, further compressing compressed performance parameters in the second storage space to make room for the compressed performance parameters from the first storage space, and
      storing the compressed performance parameters from the first storage space in the second storage space;
   wherein compressing the recorded performance parameters involves:
      calculating an average value for every two successive data points in the recorded performance parameters; and
      replacing the every two successive data points with a new data point whose value is the average value of the two successive data points being replaced.

2. The method of claim 1, wherein after multiple compressions, the second storage space contains sets of performance parameters with different amounts of compression.

3. The method of claim 1, wherein recurrently compressing the recorded performance parameters involves:
   determining whether the utilization of the first storage space has reached a threshold; and
   if so, compressing performance parameters from the first storage space.

4. The method of claim 1, wherein if the second storage space is empty, the method further comprises recording the monitored performance parameters in the second storage space without compression.

5. The method of claim 1, wherein the performance parameters can include hardware variables and/or software variables.

6. The method of claim 5, wherein the software variables include load metrics, CPU utilization, idle time, memory utilization, disk activity, transaction latencies, and other performance metrics reported by the operating system.

7. The method of claim 5, wherein the hardware variables include temperature, voltage, and current.

8. The method of claim 5, wherein the compressed performance parameters can include statistical information about the uncompressed performance parameters, wherein the statistical information can include:
   an average value of a variable;
   a variance of the variable;
   a maximum value of the variable; and
   a minimum value of the variable.

9. A computer-readable storage medium storing instructions that when executed by a computer cause the computer to perform a method for recording performance parameters from a computer system, wherein the method comprises:
   periodically monitoring performance parameters from the computer system;
   recording the monitored performance parameters in a first storage space;
   recurrently compressing the recorded performance parameters by,
      compressing the recorded performance parameters from the first storage space,
      if insufficient space is available in a second storage space which is used to store compressed performance parameters, further compressing compressed performance parameters in the second storage space to make room for the compressed performance parameters from the first storage space, and
      storing the compressed performance parameters from the first storage space in the second storage space;
   wherein compressing the recorded performance parameters involves:
      calculating an average value for every two successive data points in the recorded performance parameters; and
      replacing the every two successive data points with a new data point whose value is the average value of the two successive data points being replaced.

10. The computer-readable storage medium of claim 9, wherein after multiple compressions, the second storage space contains sets of performance parameters with different amounts of compression.

11. The computer-readable storage medium of claim 9, wherein recurrently compressing the recorded performance parameters involves:
   determining whether the utilization of the first storage space has reached a threshold; and
   if so, compressing performance parameters from the first storage space.

12. The computer-readable storage medium of claim 9, wherein if the second storage space is empty, the method further comprises recording the monitored performance parameters in the second storage space without compression.

13. The computer-readable storage medium of claim 9, wherein the performance parameters can include hardware variables and/or software variables.

14. The computer-readable storage medium of claim 13, wherein the software variables include load metrics, CPU utilization, idle time, memory utilization, disk activity, transaction latencies, and other performance metrics reported by the operating system.

15. The computer-readable storage medium of claim 13, wherein the hardware variables include temperature, voltage, and current.

16. The computer-readable storage medium of claim 13, wherein the compressed performance parameters can include statistical information about the uncompressed performance parameters, wherein the statistical information can include:
   an average value of a variable;
   a variance of the variable;
   a maximum value of the variable; and
   a minimum value of the variable.

17. An apparatus that records performance parameters from a computer system, comprising:
   a storage device, which includes a first storage space and a second storage space;
   a telemetry-monitoring mechanism configured to:
      periodically monitor performance parameters from the computer system; and to
      record the monitored performance parameters in the first storage space; and a compression mechanism configured to recurrently compress the recorded performance parameters, wherein while recurrently compressing the recorded performance parameters, the compression mechanism is configured to:
compress the recorded performance parameters from the first storage space,
if insufficient space is available in the second storage space which is used to store compressed performance parameters, to further compress compressed performance parameters in the second storage space to make room for the compressed performance parameters from the first storage space, and to
store the compressed performance parameters from the first storage space in the second storage space;

wherein while compressing the recorded performance parameters, the compression mechanism is configured to:
calculate an average value for every two successive data points in the recorded performance parameters; and to
replace the every two successive data points with a new data point whose value is the average value of the two successive data points being replaced.

18. The apparatus of claim 17, wherein after multiple compressions the second storage space contains sets of performance parameters with different amounts of compression.